May 6, 1969         B. VER NOOY         3,442,295
PIPELINE PLUGGER
Filed Jan. 12, 1967
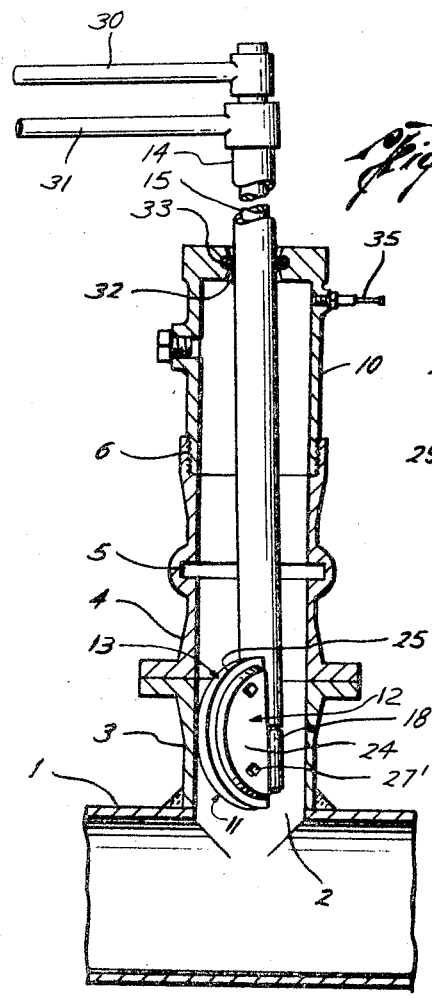
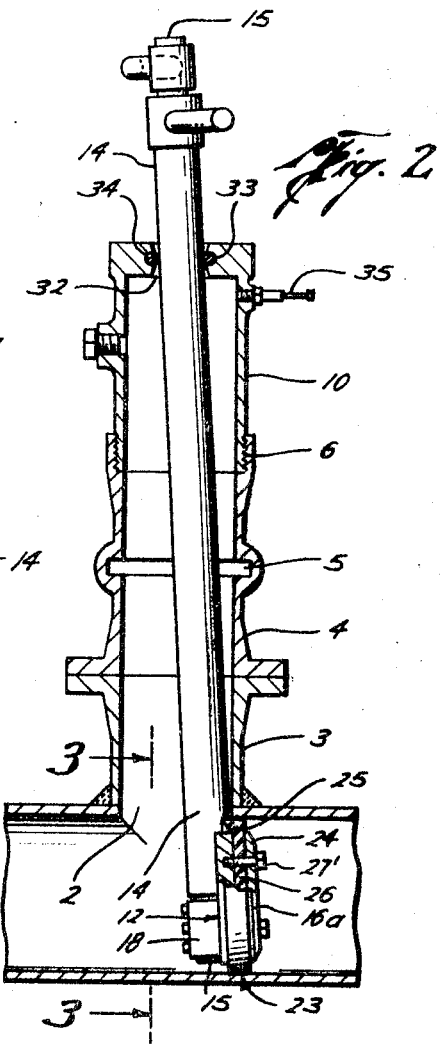
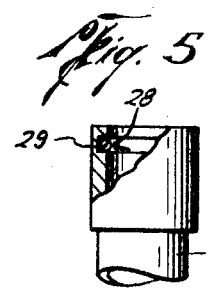
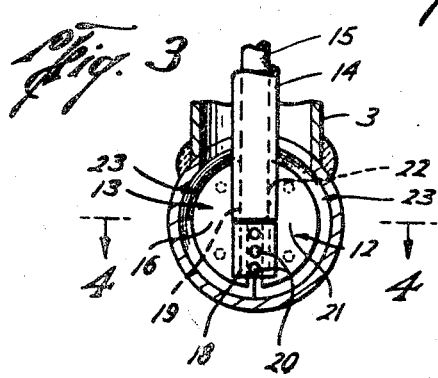
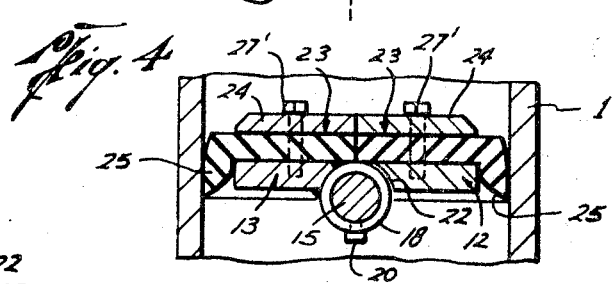
Burton Ver Nooy
INVENTOR.
BY Browning, Simms,
Hyer & Eickenroht
ATTORNEYS United States Patent Office 3,442,295
Patented May 6, 1969

3,442,295
PIPELINE PLUGGER
Burton Ver Nooy, Broken Arrow, Okla., assignor to
T. D. Williamson, Inc., Tulsa, Okla.
Filed Jan. 12, 1967, Ser. No. 608,894
Int. Cl. F16l 55/10; F16k 3/10
U.S. Cl. 138—94           7 Claims

ABSTRACT OF THE DISCLOSURE

A pipeline plugger having a plug insertable from a housing mounted on a pipeline through a lateral opening in the pipeline to a seated position adjacent the opening in the pipeline, to form a fluid barrier. The plug is composed of two semi-circular portions, each pivoted about a common axis by concentric shafts having their longitudinal axis coaxial with the common axis. The shafts extend through the housing and are rotated about their axis by handles and rotate the plug portions from a collapsed position for insertion to an expanded position for seating. The shafts are mounted by a mounting means as they pass through the housing such that a fluid seal is maintained between the housing and the shafts while providing for rocking movement of the shafts about a fulcrum, for their longitudinal movement in the housing, and for rotation about their axes.

---

This invention relates to a pipeline plugger of the type which in operation causes a plug means having two portions each pivoted about a common axis to move from a collapsed position in a housing surrounding a lateral opening in a pipeline, through the lateral opening to an expanded position in the pipeline adjacent said opening, wherein the expanded plug means is seated to form a fluid barrier.

In the art of pipeline operation, pipeline pluggers have been extensively used to close off a section of the pipeline wherein it is desired to make certain changes. For example, if the pipeline should develop a leak, it is conventional to hot-tap into the pipeline on either side of the leak and then to install a bypass loop of pipe around the section to be repaired. A split T or nipple is then welded to the pipeline on either side of such section between it and the junctures of the bypass loop with the pipeline. A tapping valve is then attached to the T, a hot tapping machine mounted on the tapping valve and then the tapping machine operated to tap into the pipeline. Thereafter, the tapping machine is dismounted with the tapping valve closed and the plugger mounted on the tapping valve. The latter is then opened and the plugger operated to advance the plug into the pipeline to form a fluid barrier therein. This practice not only permits continuing use of the pipeline during repair, but also avoids the necessity of draining long sections of the pipeline to the nearest block valves on either side of the leaky section in order to make the repair.

Other uses for pipeline pluggers are known to those skilled in the art and need not be described.

In my prior U.S. Patents Nos. 2,906,295, 2,812,778 and 3,025,885, there are disclosed pluggers of the general type referred to above, i.e., those involving the seating of a plug means to one side of a side opening in a pipe. These disclosed pluggers, while operating very effectively, present problems in their manufacture for sale in a low cost market and these problems have been solved by the plugger disclosed in my U.S. Patent No. 3,154,106, which plugger is of simplified design, economical to manufacture and of lesser overall weight than prior pluggers.

Generally, pluggers of the type described, with the exception of that described in my U.S. Patent No. 2,812,778, require that the lateral opening in the pipeline and the inside diameter of the housing surrounding the opening be approximately the same size as the inside diameter of the pipeline to be sealed. With an opening of this size, proportionately sized equipment, such as a tapping machine and tapping valve, must be employed in cutting and completing the tap, and the larger this opening the more expensive the equipment needed. This is also true of the nipples and plugs which become a permanent part of the pipeline when the tap is completed. Thus, it can be seen that a lateral opening having a diameter somewhat less than the inside diameter of the pipeline is desirable.

Also, the machinery employed for cutting the lateral openings is difficult to properly center when cutting an opening to encompass approximately 180° of the circumference of the line. Yet, unless the opening is cut accurately so that its axis substantially intersects that of the pipeline, the plug member cannot be moved therethrough into the pipeline. Even assuming the opening to be cut accurately, the edges of the pipeline adjacent thereto constitute points of weakness, especially inasmuch as the principal strength factor of circular construction adjacent the opening has been nullified.

The plugger disclosed in my U.S. Patent No. 2,812,778, is of such construction to allow the lateral opening to be smaller than the pipeline inside diameter, but, as previously stated, this plugger, while operating effectively, presents problems of manufacture and cost in a low-cost market.

It is thus an object of this invention to provide a plugger which may be used in plugging a pipeline with a lateral opening therein smaller than the inside diameter of the pipeline and which is of simplified design so that it can be manufactured more economically.

It is another object of this invention to provide such a plugger in which the housing and associated valve for such plugger may be of a diameter considerably less than the inside of the pipeline.

Another object is to provide such a plugger which is particularly adapted to be designed for use in low pressure pipelines, especially those of smaller sizes. As a result, the plugger finds special application in municipal gas and water distribution systems where previous pluggers have not been widely used due to their expense, weight and size. However, it is to be understood that the plugger of this invention can be adapted for use in larger size pipelines at relatively higher pressures, although it is probably not so well suited for this use as are the pluggers described in my prior applications.

Another object of the invention is to provide such a plugger in which movement of handles, each connected to a plug section through a shaft, causes a substantially identical movement of plug section connected thereto so that, by observation of the movement of the handles, movement of the plug setcions can be readily ascertained.

Another object of the invention is to provide such a plugger with which any pressure differential existing across a plug means while the latter is in seated position can be decreased to facilitate withdrawal of the plug means simply by turning one of the handles to thereby allow fluid to bypass the plug means.

Another object of the invention is to provide such a type of plugger constructed so that it can be mounted upon a pipeline without first rotating its fluid tight housing about its axis into a specific orientation with respect to the pipeline and yet the plug means can be landed in seated position. In pluggers such as that shown in my U.S. Patent 2,906,295, the plugger housing must be rotated, prior to mounting, until the plug faces either upstream or downstream of the pipeline so that the plug can be properly landed in the latter. Unless this orientation is properly done, the plug will not seat properly and, in some cases, even the flanges on the T or tapping valve to which the plugger is attached must likewise be oriented during their installation to assure proper alignment of the plugger. In the instant plugger, the fluid tight housing can be attached to the pipeline without any particular rotative orientation thereof and the plug properly oriented for landing simply by turning the carrier rod. Also, the plugger, once installed, can be made to seal against pressure from either direction simply by landing the plug means on one side or the other of the side opening. This is useful when progressively pressure-testing sections of pipeline.

Another object of this invention is to provide such a plugger in which a plug means is collapsible and expandable to permit collapse of the plug means into a shape for passage through the lateral opening in the pipeline which is smaller than the inside diameter of the pipeline, and expandable into a shape for sealing engagement with the line adjacent to said lateral opening to form a relatively rigid fluid barrier across the line.

Other objects, advantages, and features of the invention will be apparent to one skilled in the art upon consideration of the specification, claims, and drawings, wherein:

FIG. 1 is a view partially in section and partially in elevation, showing the preferred embodiment of the plugger constructed in accordance with this invention and showing the plug means in its collapsed position within the housing;

FIG. 2 is a view partially in section and partially in elevation, showing the preferred embodiment of the plugger constructed in accordance with this invention and showing the plug means in its expanded and seated position in the pipeline;

FIG. 3 is a view in elevation taken at 3—3 in FIG. 2, showing a preferred configuration of the means rigidly connecting the shafts to the plug portions;

FIG. 4 is a sectional view taken at 4—4 in FIG. 3, showing a preferred construction of the plug means; and FIG. 5 is an enlarged view partially in section and partially in elevation, showing a preferred configuration of a seal means between the shafts.

In accordance with this invention, a pipe plugger includes a plug means having two sealing portions, each pivoted about a common axis, and each of which are rigidly connected to one of two concentric shafts. The shafts rotate about their longitudinal axis which is coaxial with the common axis. The shafts extend through a fluid-tight housing mounted on a pipeline to surround a lateral opening in the pipeline, which may be considerably smaller in diameter than the inside diameter of the pipeline. When the shafts are rotated they cause the sealing portions to pivot about the common axis from a collapsed position, permitting movement of the plug means from the housing through the lateral opening into the pipeline and laterally therein, to an expanded position in which the plug is adapted to extend across the pipe on one side of the opening to provide a fluid barrier.

The shafts extend through the housing in a sealing relationship therewith and, in a preferred form of this invention, a means is provided mounting the shafts as they pass through the housing for longitudinal movement into and out of the housing, for rocking movement about a fulcrum, and for rotation thereof. This means provides a fluid-tight seal between the shafts and housing even during the described movement of the shafts.

Referring now to the drawings where like characters of reference will be used throughout the several views to designate like parts, in FIGS. 1 and 2 there is shown a pipeline 1 through which a lateral opening 2, which may have considerably less diameter than the inside diameter of the pipeline 1, has been cut. A nipple 3 has been welded on the pipeline 1 and surrounds the opening 2. Mounted on nipple 3 is a valve 4 which has threads 6 at its exposed end for external connections and includes a valve member 5 which may be closed to prevent the passage of fluid from the pipeline 1 when the threaded end of the valve is exposed to atmosphere or other pressures.

Adapted to be connected to the valve 4, as shown in FIGS. 1 and 2, is the pipeline plugger of this invention. This plugger generally comprises a fluid-tight housing 10, a plug means 11, including two plug portions 12 and 13, a shaft 14 rigidly connected to the plug portion 12 and a shaft 15 rigidly connected to the plug portion 13 and mounted inside and concentrically with respect to the shaft 14. The plug portions are pivoted by the rotation of the shafts about a common axis, which is coaxial with the longitudinal axis of the shafts 14 and 15, from a collapsed position within the housing 10, as shown in FIG. 1 to an expanded position when seated in the pipeline 1 adjacent the opening 2, as shown in FIG. 2. The shafts are mounted in the housing 10 so that the plug means 11 can be moved by the longitudinal movement of the shafts from a retracted position in the housing to the seated position in the pipeline.

Each of the plug portions 12 and 13, respectively, includes a hinge plate, a sealing element, and a backing plate, all bolted or otherwise secured together to form a plug portion which is preferably semi-circular. Referring to FIGS. 3 and 4, the plug portion 13 is partly formed by hinge plate 16 which is preferably semi-circular and has a diameter somewhat less than the inside diameter of the pipeline 1. The plate 16 includes sleeve 18 welded along substantially half the length of a diametrical edge 19 of the plate 16 and is mounted by the sleeve 18 on the lower end of the inner shaft 15. The edge 19 is curved to conform with the outer peripheries of the sleeve 18 and the shaft 14. The sleeve 18 may be rigidly connected to the shaft 15, such as by being bolted thereto by studs 20, and when this is accomplished, the remaining length of the edge 19 is substantially flush against the periphery of the lower end of the shaft 14.

The plug portion 12 is partly formed by a hinge plate 21 which includes a diametrical edge 22 curved along approximately half of its length to fit flush against the periphery of the lower end of shaft 14, and curved along the remainder of its length to conform with the periphery of sleeve 18. The plate 21 may be rigidly connected to shaft 14, such as by welding along that portion of the edge 22 flush with the shaft 14, and is free to rotate by rotation of shaft 14 with respect to shaft 15.

Each of the plug portions is further formed by seal means 23 and back-up plates 24 bolted or otherwise connected to the hinge plates 16 and 21. The seal means 23 are preferably semi-circular sections of rubber or other resilient material having a central body portion 26 which may be reinforced with layers of cloth, light screen or other reinforcing material, and an annular lip 25 integral with the body portion 26. The seal section is of a diameter larger than the hinge plates 16 and 21 and when the plug 11 is expanded, extends across the entire cross section of the pipeline to provide a fluid barrier therein.

The seal means can take other forms than the lip type seal shown. For example, it may be an O-ring disposed in a groove in the periphery of the plug body. However, in any event, the seal means should be of the fluid energized type, that is, the seal is of a size and structure that when the plug is initially seated, there will be an interference or mechanical type seal between the seal means and the pipeline. Then, as the fluid pressure differential is increased across the seal, the seal responds thereto in that the pressure differential acts to urge the seal into tighter and tighter engagement with the pipe wall as the differential increases.

The back-up plates 24 are also preferably semi-circular, but of a diameter less than that of the seal means and approximately the same as the diameter of the hinge plates. The sealing means and back-up plate can be mounted on the hinge plate, such as by studs 27′, with both the hinge plates and back-up plates serving as a back-up for the seal means. With this arrangement, fluid will not leak through the studs as the seal means will sealingly engage the studs due to the pressure of engagement with the hinge plate and the back-up plates. When the plug means is expanded, the diametrical edges of the sealing means will engage each other and form a seal between the plug portions.

The shafts 14 and 15 extend outside the housing and to insure that fluid does not escape between the shafts and out the housing, a means for sealing the annulus between the shafts may be provided. As illustrated in FIG. 5, this means may preferably be an O-ring 28 disposed in a groove 29 in the annulus between the shafts. This seal may be at any place along the length of the shafts where they are concentric.

Each of the shafts 14 and 15 may include a handle. As shown in FIGS. 1 and 2, the shaft 15, the upper end of which extends beyond the upper end of shaft 14, includes a handle 30 and the shaft 14 includes a handle 31. Thus, rotation of the handles results in identical movement of the corresponding plug portions so that by observation of the movement of the handles, the corresponding movement and positions of the plug portions can be readily determined.

The shafts extend through the housing in a sealing relationship therewith through an opening 32 in the upper end of housing 10. A means is included in the housing for mounting the shafts which maintains the seal between the shafts and housing while providing for longitudinal movement of the shafts into and out of the housing, for rotation of the shafts about their axes, and for rocking movement of the shafts about their axis, and for rocking movement of the shafts about a fulcrum. This means is illustrated in its preferred form as including an O-ring 33 disposed in an annular groove 34 around the wall of the opening 32. The wall of the opening is flared in both directions as it moves away from the groove 34. This arrangement allows the shaft to be rocked about its contact with the O-ring. The mounting means utilized with this invention, including the embodiment described, is substantially the same as the mounting means shown and described in my U.S. Patent No. 3,154,106, and may take the various forms described in detail and shown therein. Reference is made to that patent, which is assigned to the same assignee as this application, for detail description of this means and the various forms that it may take.

In operation, when the housing 10 is mounted on the pipeline over the closed valve 4, the plug 11 is in a retracted position within the housing and is collapsed, as illustrated in FIG. 1. The handles 30 and 31 are adjacent each other. When the valve 4 is opened and the pressure in the housing equalized, the plug is lowered into the pipeline and laterally therein to a position adjacent the opening 2. The handles are then manipulated to push the plug to one side of the lateral opening and rotated away from each other, thus pivoting the plug portions from the collapsed position to an expanded position approximately at the point where the handles are 180° from each other, as shown in FIG. 2.

When the plug is to be removed, one of the handles can be rotated away from the other back toward the initial adjacent position thus breaking the seal in the pipeline and allowing fluid to flow to equalize the pressure on both sides of the plug 11. When this is accomplished, the plug can be collapsed by moving both of the handles to their initial adjacent positions and then the plug means can be pulled back to its retracted position in the housing. The valve member 5 may be closed and the pressure in the housing may be released by relief valve 35. The housing may now be removed and the tap is ready for further disposition.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe plugger of the type having a plug member insertable into a pipe through a lateral opening therein to seat in the pipe, wherein the extent across the lateral opening may be smaller than the extent across a cross-section of the interior of the pipe adjacent the lateral opening, comprising, in combination: a housing mountable on the pipe surrounding said opening to provide a fluid tight closure communicating with said opening; plug means having two portions each pivoted about a common axis from a collapsed position permitting movement of the plug means from the housing through the lateral opening into the pipe and then laterally therein to an expanded position in which the plug is adapted to extend across the pipe on one side of said opening to provide a fluid barrier therein, and means for pivoting said portions about said common axis between said positions including two concentric shafts extending in sealing relationship through the housing and having their longitudinal axes coaxial with said common axis, each of said shafts connected to one of said portions and rotatable independently of the other about said common axis.

2. The plugger of claim 1 further provided with means for mounting said shafts as they pass through the housing for longitudinal movement into and out of the housing, for rocking movement about a fulcrum, and for rotation of the shafts about said common axis while providing a fluid tight seal between the shafts and housing, whereby said shafts are moved longitudinally to move said plug from the housing through the lateral opening, then rotated independently to pivot said portions to said expanded position and rocked about said fulcrum to position the plug means across the pipe.

3. The plugger of claim 1 wherein each of said shafts includes a handle rigidly connected thereto outside the housing for rotating the shafts, the handles about said common axis from a first position when the portions are in collapsed position to a second position when the portions are in the expanded position whereby the relative position of the handles substantially corresponds to the relative position of said portions.

4. The plugger of claim 1 wherein each of said portions includes a fluid energized sealing member engaging the pipe and each other in a fluid tight relationship and forming a fluid barrier therein when the portions are in their expanded position across the pipe.

5. The plugger of claim 1 further provided with means for sealing between the two shafts to prevent fluid from passing therebetween and out the housing.

6. The plugger of claim 5 wherein said sealing means is an O-ring disposed in a groove between the shafts along their length.

7. The plugger of claim 2 wherein each of said portions includes a fluid energized sealing member engaging the pipe in a fluid tight relationship and forming a fluid barrier therein when the portions are in their expanded position across the pipe.

References Cited
UNITED STATES PATENTS

| | | | |
|---|---|---|---|
| 2,812,778 | 11/1957 | VerNooy | 138—94 |
| 2,906,295 | 9/1959 | VerNooy | 138—94 |
| 3,154,106 | 10/1964 | VerNooy | 138—94 |

PATRICK D. LAWSON, *Primary Examiner.*

U.S. Cl. X.R.

251—193